D. Barnum,
Boiler-Tube Packing.
No. 1,552. Reissued Oct. 13, 1863.
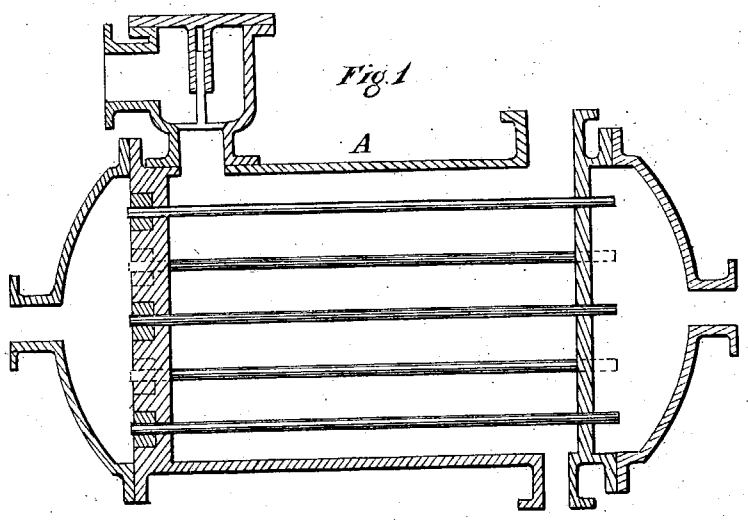
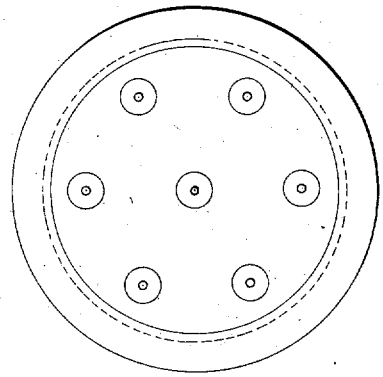
Witnesses
Saw Grubb
Arthur S. McIntire
Inventor
Daniel Barnum
N. PETERS, PHOTO-LITHOGRAPHER, WASHINGTON, D. C.

UNITED STATES PATENT OFFICE.

DANIEL BARNUM, OF NEW YORK, N. Y.

IMPROVEMENT IN SURFACE-CONDENSERS.

Specification forming part of Letters Patent No. 24,087, dated May 24, 1859; Reissue No. 1,552, dated October 13, 1863.

*To all whom it may concern:*

Be it known that I, DANIEL BARNUM, of the city, county, and State of New York, have invented new and useful improvements in constructing compensating-joints between tubes and tube-sheets in tubular surface-condensers for steam-engines; and I do hereby declare the following to be a full and clear description of the same, reference being had to the drawings, which make part of the same.

Figure 1 is a sectional elevation of the condenser, exhibiting the whole interior so plainly as scarcely to require a detailed description or reference by letters or figures. Fig. 2 is an end view of the condenser, with the cap which forms one of the condensing-water compartments removed for the purpose of showing the ends of the tubes in place, and the india-rubber grommet packing-rings around each tube, in recesses formed in the tube-sheet in the condensing-water compartment, the grommet-packing being pressed into the recesses, so that the elasticity of the packing contracts around the tubes and expands against the sides of the recesses in the tube-sheet, thus making perfectly tight joints between each separate tube and its tube-sheet.

The nature of my invention consists mainly in the use of india-rubber or other elastic grommet packing-rings in recesses and around each separate tube, so applied by pressure that the elasticity of the packing will contract tightly upon the surface of each tube and expand against the sides of each recess, and thus making perfectly tight compensating-joints that will not slip on the metal or break the joints by means of the elasticity of the packing, leaving each tube to expand and contract by itself as the temperature varies in the condenser by reason of the intermitting exhaust of steam within the condenser, thus saving all strain upon either the metal of the tubes or sides of the condenser.

To enable others to make and use my improvements, I refer to the drawings, which show that I reverse the ordinary arrangement of condensing-surfaces, as used by Hall and others before my invention—that is, I pass the condensing-water through the tubes and thus distribute the same equally over the condensing-surface at its lowest temperature—while by a rapid circulation of the water through the tubes the heat absorbed in condensing the steam upon the surface of each tube is immediately carried out of and away from the condenser. I thus maintain cool and active condensing-surfaces in all the tubes, and am thereby enabled to reduce the size of my condenser materially, as compared with Hall's and others.

A, Fig. 1, shows the whole arrangement in section, without giving size or proportions, these having to be varied and adapted to the various conditions and sizes of engines required. The size of tubes and their number may be varied also, as well as the velocity of the currents through them to suit the views of engineers.

As my invention is limited mainly to the grommet packing-ring joints it is not deemed necessary to give detailed descriptions of the various parts, of connections, pumps, &c., it being understood that these are to be supplied as required to complete the operations.

Figure 1 shows a cap upon each end of the condenser, covering all the ends of the tubes and forming at each end a condensing-water compartment, in which the joints are made so that the pressure of the water as it is forced through the tubes, as well as the vacuum in the condenser, tends to hold the grommet-rings tightly within the recesses and around the tubes while the condenser is in operation.

Fig. 2 shows the ends of the tubes in place and india-rubber grommet packing-rings pressed tightly within the recesses, so that the elasticity of the packing-rings contract themselves tightly upon the tubes and expands the same against the sides of the recesses so as to form perfectly tight joints between the tube-sheets and tubes.

It should be understood that the grommet-rings are to be made relatively with the size of the tubes and the recess thicker than the spaces between them, so as to require pressure to force the grommet-ring packing, or its equivalent, into the recesses and around the tubes, and it may be understood, also, that the joints, when the grommet packing-rings are properly adapted to and pressed within the spaces between the tubes and sides of the recesses, will be perfectly tight without followers and yet allow the tubes to expand and contract as the temperature in the condenser varies, without slipping on the metal or breaking the joints, the elasticity of the grommet-rings compensating for the expansions and contractions in the metal of the tubes, while the pressure of the water upon the grommet-packing, as well as the vacuum within the condenser, tends to prevent the packing from slipping and rendering the use of followers less necessary than would be the case were the joints made in the vacuum compartments of the condenser, as was done by Hall or others before my invention.

Having thus fully described and shown my invention with one mode of applying the same practically and usefully, I remark that I do not claim a continuous sheet of india-rubber packing for making a series of tubular joints in surface-condensers.

What I do claim as my invention, and desire to secure by Letters Patent of the United States, is as follows:

1. The use of india-rubber grommet-rings, or the equivalent thereof, in recesses made in tube-sheets and around tubes, for making perfectly tight compensating-joints between tubes and tube-sheets in surface-condensers, substantially as and for the purposes specified.

2. Making compensating-joints between tubes and tube sheets, with india-rubber grommet packing-rings in the condensing-water compartments of surface-condensers, for the purpose of securing the combined action of the water and vacuum in pressing and holding the packing within the recesses and around the tubes when in operation, and thus maintaining perfectly tight-joints, whether followers are or are not pressing upon the packing, susbtantially as and for the purposes specified.

3. The method, substantially as specified, of making yielding joints between the tubes and tube-sheets in the condensing-water compartments of surface-condensers, and of thus compensating the expansions and contractions in the tubes by means of leaving a portion of india rubber or other elastic packing immediately surrounding each tube free, so that its elasticity can yield longitudinally with the tubes and compensate for their varying lengths without causing the packing to slip on the metal, substantially as and for the purposes specified.

DANIEL BARNUM.

Witnesses:
F. S. BARNUM,
I. A. BARNUM.